United States Patent
Pano et al.

(10) Patent No.: US 8,408,382 B2
(45) Date of Patent: Apr. 2, 2013

(54) INSTANT POWDER CONVEYOR DEVICE OF A DRINKS PREPARING MACHINE

(75) Inventors: Giovanni Pano, Steinach (CH); Jörg Henke, Kreuzlingen (CH)

(73) Assignee: Eugster/Frismag AG, Amriswil (CH)

( * ) Notice: Subject to any disclaimer, the term of this patent is extended or adjusted under 35 U.S.C. 154(b) by 85 days.

(21) Appl. No.: 12/925,387

(22) Filed: Oct. 20, 2010

(65) Prior Publication Data

US 2011/0088999 A1    Apr. 21, 2011

(30) Foreign Application Priority Data

Oct. 21, 2009   (DE) .................... 20 2009 014 265 U

(51) Int. Cl.
*B65G 41/00*   (2006.01)

(52) U.S. Cl. ................ 198/550.1; 198/550.01; 222/240

(58) Field of Classification Search ................ 198/658, 198/671, 550.01, 550.1, 545; 222/240, 241, 222/242
See application file for complete search history.

(56) References Cited

U.S. PATENT DOCUMENTS

| | | | | |
|---|---|---|---|---|
| 1,880,840 A * | 10/1932 | Currier | ....................... | 198/550.1 |
| 2,822,934 A * | 2/1958 | Bartelt | ......................... | 222/240 |
| 3,223,227 A * | 12/1965 | Dudte | ............................ | 198/671 |
| 3,411,676 A | 11/1968 | Biedess | | |
| 4,708,268 A * | 11/1987 | Wurtz | ............................ | 222/241 |
| 4,861,216 A * | 8/1989 | Fullemann et al. | ........ | 198/550.1 |
| 5,333,762 A * | 8/1994 | Andrews | ....................... | 198/671 |
| 5,524,796 A * | 6/1996 | Hyer | ............................. | 222/241 |
| 5,975,357 A | 11/1999 | Topar | | |
| 7,270,469 B2 * | 9/2007 | Goode et al. | .................... | 366/27 |

FOREIGN PATENT DOCUMENTS

| | | |
|---|---|---|
| DE | 962417 | 4/1957 |
| DE | 20 04 391 | 9/1970 |
| DE | 2 239 185 | 3/1973 |
| DE | 28 56 308 | 7/1980 |
| DE | 20 2006 008 409 | 9/2006 |
| EP | 0 728 664 | 8/1996 |
| EP | 1 916 207 | 4/2008 |
| FR | 694878 | 12/1930 |

* cited by examiner

*Primary Examiner* — James R Bidwell
(74) *Attorney, Agent, or Firm* — DLA Piper LLP (US)

(57) ABSTRACT

An instant powder conveyor device of a drinks preparing machine including a rotatable wire conveyor spindle disposed substantially horizontally in a bottom area of the instant powder container. At the wire conveyor spindle, an outflow opening is provided. In the instant powder container, above the wire conveyor spindle at least one back feed conveyor screw is arranged. Its back feed conveyor track starts near the end of the wire conveyor spindle, or conveyor track, and is shorter than the conveyor track of the wire conveyor spindle.

11 Claims, 2 Drawing Sheets

Section A – A

Section B – B

Section C – C

Section A – A

Section C – C

Section D – D

INSTANT POWDER CONVEYOR DEVICE OF A DRINKS PREPARING MACHINE

BACKGROUND OF THE INVENTION

1. Field of the Invention

Figure 1:
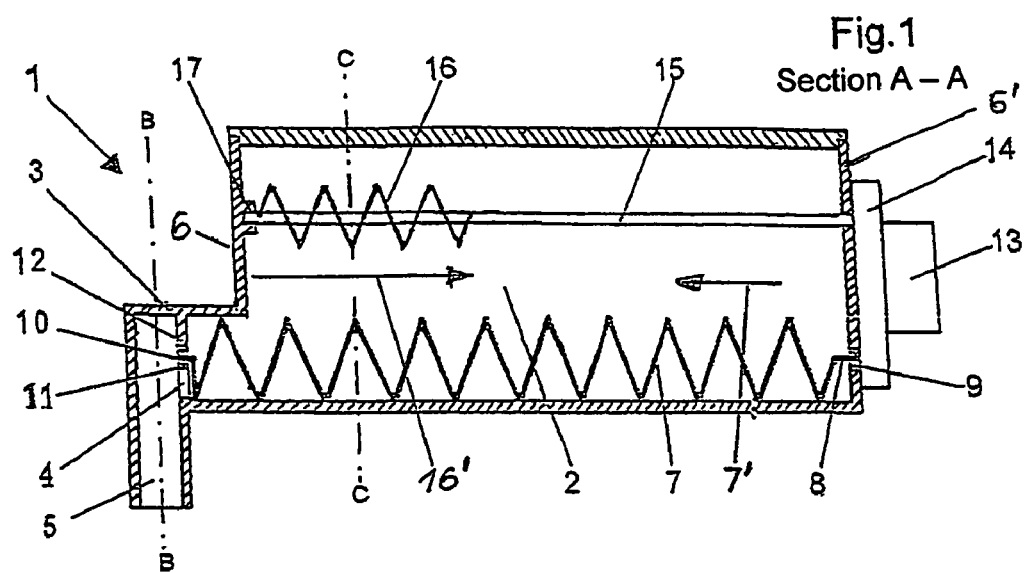
Figure 2:
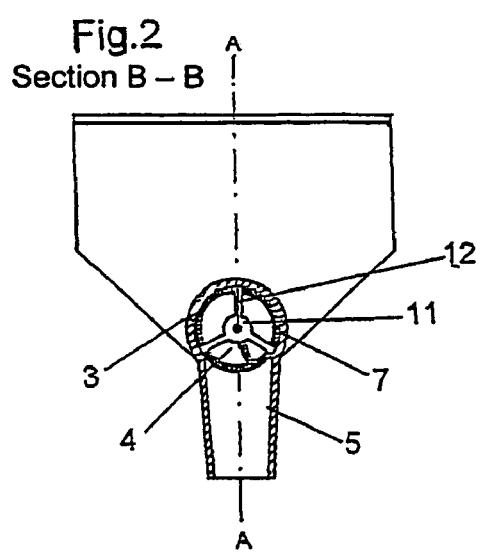
Figure 3:
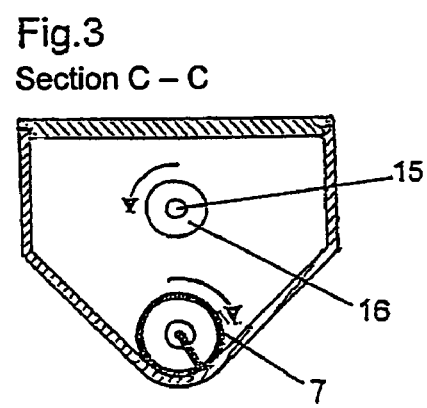

The present invention relates to an instant powder conveyor device of a drinks preparing machine.

2. Description of the Related Art

In prior art drinks preparing machines, an instant powder container each is provided wherein instant powder is stocked which is supplied by means of a conveyor device to a brewing or mixing or preparation arrangement. The conveyor device comprises, in particular, a conveyor screw or wire conveyor spindle disposed within a lower area of the instant powder container and suited to exactly dose smaller mounts of instant powder. Since the fluidability of the instant powder in the instant powder container may be impaired, particularly by vapor or air humidity, which leads to a so-called bridge formation of the instant powder so that the instant powder is not easily fluidic any more, the conveying function of the wire conveyor spindle or of the conveyor screw may be reduced or interrupted as well. In particular, the wire conveyor spindle or the conveyor screw may carve out a tunnel corresponding to its diameter in the power stock, whereupon no further conveying will be possible. This is particularly true in the case of vapor-generating drinks preparing devices where the vapor may enter through an outflow opening for the instant powder into the instant powder container at one end of the wire conveyor spindle or the conveyor screw, respectively. In order not to impair the conveyor action of the wire conveyor spindle, or the conveyor screw, means have already been known to loosen up the instant powder in the instant powder container.

In the food industry, for instance, where fine powder is conveyed, or dosed, from a mostly conical or trapezoidal container by means of a screw conveyor horizontally disposed in the lower area thereof, agitators and/or vibrators or paddles, strikers, air cushions, slip coatings are employed completely above the screw conveyor in order to get the powder to an inflow of the screw conveyor (EP-A 1 916 207). These measures, however, require substantial technical elaboration particularly with a view to the drives of the agitators, vibrators, paddles, strikers, and/or they are not sufficiently effective so that they can hardly be taken into consideration for household preparing devices or semi-professional applications.

In instant powder containers from which the instant powder is horizontally conveyed, the instant powder should, as a rule, be evenly distributed in the stock which means that the instant stock container should at all places be relatively evenly be filled up. With a view to the horizontal conveying process by means of the rotatable wire conveyor spindle or a corresponding conveyor screw horizontally arranged in a bottom area of an instant powder container, at the end of which an outflow opening is disposed, the instant powder will stow up at this end. An even distribution of the instant powder in the instant powder container may therefore be disturbed in case of the respective function of the rotating wire conveyor spindle or conveyor screw. By the forced heaping up of the instant powder in one area of the instant powder container, a lid on the instant powder container may, undesirably, be lifted.

BRIEF SUMMARY OF THE INVENTION

The present invention is primarily based on the task to provide a highly even distribution of the instant powder in the instant powder container while considering the respective conveying function of a rotatable horizontally arranged wire conveyor spindle, or conveyor screw, at the end of which an outflow opening is disposed.

This task is solved by the provision of the instant powder conveying device comprising a rotatable wire conveyor spindle or conveyor screw substantially horizontally disposed in a bottom area of an instant powder container, at the end of which an outflow opening is provided; and in the present invention in the instant powder container above the wire conveyor spindle or the conveyor screw, at least one back feed conveyor screw contra-rotating thereto is disposed, and the back feed conveyor track of this back feed conveyor screw starts near the end of the wire conveyor spindle or conveyor track, and the back feed conveyor track is shorter than the conveyor track of the wire conveyor spindle or conveyor screw.

By means of the at least one back feed conveyor screw disposed above the wire conveyor spindle, or conveyor screw, by which the instant powder is conveyed in the normal conveying direction via a conveying track towards the outflow opening, which is counter-rotating relative to the wire conveyor spindle, or conveyor screw, and the back feed track of which starts near the end of the wire conveyor spindle, or conveyor screw, instant powder is effectively conveyed back into the interior of the instant powder container if a concentration occurs in the area above the outflow opening so that the instant powder is distributed at least approximately evenly over the length of the conveyor spindle, or conveyor screw and does not significantly heap up at the outflow side end of the conveyor track. In this way, it is avoided that a lid of the instant powder container is lifted up. The effective back conveying section of the back feed conveyor screw, and thus the back feed track, may simply be shorter provided than the conveying track of the conveyor spindle, or conveyor screw.

Depending on the kind and the properties of the instant powder, it is possible to add, in case of a driven back feed conveyor shaft, at least two back feed screws exchangeably and in axial distance relative to one another in order to obtain an approximately even distribution of the instant powder in case of different instant powder properties. The back feed track extends, in this case, over the at least two back feed conveyor screws.

The term conveyor screw as used in the text of the present application is meant to also cover similar non-complicated conveyor elements rotating about an horizontal rotating shaft and essentially horizontally conveying conveyor elements, such as conveyor spindles.

In the present invention, the at least one back feed conveyor screw is designed as having a smaller conveying efficiency as compared to the conveying efficiency of the wire conveying spindle, or conveyor screw. Advantageously, the small conveying efficiency of the back feed conveyor screw is sufficient since part of the instant powder amount conveyed by the wire conveyor spindle, or conveyor screw, to the outflow opening will flow out, as provided, of the outflow opening.

To further on reduce the technical elaboration, the arrangement according to the present invention provides that the back feed conveyor screw and the wire conveyor spindle, or conveyor screw, are gear-wise or transmission-wise connected with a common motor, preferably with an electric gear motor.

In order to loosen up the instant powder in the area aside of the back feed track by means of only a few uncomplicated parts and, particularly, without any separate gear for interference-free conveying by means of the wire conveyor spindle, or conveyor screw, at least one striking element which is elastically adjustable in axial direction of the wire conveyor spindle, or conveyor screw, and is sufficiently disposed within the wire conveyor spindle, or conveyor screw, is axially displaced relative to the back feed conveyor track of the back feed conveyor screw within the instant powder container.

The at least one striking element does not require any separate drive. It is driven by the wire conveyor spindle, or the conveyor screw, itself, namely via an adjusting path at the end of which the striking element bounces out of the wire conveyor spindle, or the conveyor screw, and bounces back in view of the elastic adjustability, moving in this way the instant powder, or dissolving by striking the instant powder directly or indirectly so that the instant power arrives in the substantially horizontally disposed wire conveyor spindle, or conveyor screw, and is conveyed it. In detail, it is possible that by the elastic adjustment of the striking element, unless it is striking directly against hardened instant powder, the striking element may pound against a flank of the wire conveyor spindle, or conveyor screw, which follows the flank from which it had slipped out. By the impact of the striking element on the wire conveyor spindle, or conveyor screw, the impact may indirectly be transferred via the wire conveyor spindle, or conveyor screw, to the instant powder surrounding it in order to avoid bridge creation of the instant powder.

For instance, the striking element and the wire conveyor spindle, or conveyor screw, are so disposed, or designed, that after each rotation of the wire conveyor spindle, or conveyor screw, the striking element slips out of the latter bouncing to the following flank thereof.

Depending on the arrangement and the dimensioning of the above-referenced parts, this bounce may also occur after one partial rotation each only which might make a relatively small, and more even, wear possible.

The effect of the elastically adjustable striking element is the larger, the larger the pitch or the thread, respectively, of the wire conveyor spindle, or conveyor screw.

Furthermore, in the present invention, the striking element is disposed outside the wire conveyor spindle, or conveyor screw, preferably above the wire conveyor spindle, or conveyor screw, on a stationary striking element carrier as a suspension, wherein a return spring is connected with the striking element carrier on one hand and with the striking element on the other. The suspension may however also be provided at an instant powder container lid. The arrangement is in both cases uncomplicated and guarantees a reliable function of the striking element.

The striking element carrier of the present invention is compact and cartridge shaped and incorporates one section of the back feed conveyor screw shaft. On this section, the back feed conveyor screw may be supported and connected, for transferring the rotational movement, via a gear unit with the motor, which may be disposed outside the instant powder container.

In addition, the striking element of the present invention is particularly simply connected with the striking element carrier via a plate spring as the return spring. The plate spring serves, therefore, for the provision of the striking element on the suspension and for the elastic adjustability of the striking element.

Furthermore, in the present invention, the striking element preferably includes an impacting face substantially disposed transverse to the axial direction of the wire conveyor spindle, or conveyor screw. The impacting face enlarges the area of influence of the striking element on the instant powder. For wear reduction, the impacting face of the striking element may, furthermore, be inclined about the pitch angle of the wire conveyor spindle, or conveyor screw, relative to the normal cross sectional area thereof, which is considered at right angles relative to the axis of the wire conveyor spindle, or conveyor screw.

The impacting face of the striking element is preferably adapted, furthermore, to the cross section of the bottom area of the instant powder container but movable, non-impeded by the bottom area, to have an effect on the instant powder.

In order to be effective over a larger axial extension of the wire conveyor spindle, or conveyor screw, to loosen up the instant powder, a plurality of striking elements is arranged in a staggered way along the axial direction of the wire conveyor spindle, or conveyor screw.

BRIEF DESCRIPTION OF THE SEVERAL VIEWS OF THE DRAWINGS

FIG. 1 is an instant powder conveyor device of a drinks preparing machine according to the present invention shown in longitudinal cross section including a wire conveyor spindle and a back feed conveyor screw operating oppositely thereto, FIG. 2 is a cross section of the instant powder conveyor device of FIG. 1 taken along the sectional plane B-B, FIG. 3 is a cross section of the instant powder conveyor device of FIG. 1 taken along the sectional plane C-C, FIG. 4 is an instant powder conveyor device of the drinks preparing machine according to the present invention shown in a longitudinal section of FIG. 1, additionally having two striking elements, in a first position of the striking elements, FIG. 5 is an instant powder conveyor device of FIG. 4 with the two striking elements in a second position of the striking elements, FIG. 6 is a cross section through the instant powder conveyor device of FIG. 4 taken along the sectional plane C-C, and FIG. 7 is a cross section of the instant powder conveyor device of FIG. 4 taken along the sectional plane D-D.

DETAILED DESCRIPTION OF THE INVENTION

In the following, two exemplified embodiments will be described based on the drawings including seven figures wherein a wire conveyor spindle is shown in a simplified form and from which further advantageous details will result.

In FIGS. 1, 4 and 5, an instant powder conveyor device is generally referred to by 1 which includes an instant powder container 2 for stocking instant powder. On the, non-designated, groove-shaped bottom area of the instant powder container, the former leads into an outflow cylinder 3, specifically at one front wall 6 of the instant powder container 2 which faces a back wall 6'. Via an outflow opening 4, the outflow cylinder is connected with a perpendicularly disposed discharge chute 5 which leads to a brewing or mixing or preparing arrangement, not shown.

Into the outflow cylinder 3, there extends, as shown in FIG. 1, an end of a wire conveyor spindle 7 horizontally disposed in the bottom area of the instant powder container the conveyor spindle drive journal 8 of which is supported on one end in a conveyor spindle shaft bearing 9. The conveyor spindle drive journal 8 is connected, transmission-wise, via a drive gear 14 with an electro motor 13.

At its outflow cylinder side end, the wire conveyor spindle 7 is pivoted by means of a front-side conveyor spindle bearing journal 10 in a front-side conveyor spindle journal bearing 11. A conveyor spindle journal bearing connection shown in detail in FIG. 2 is referred to as 12.

The conveyor direction of the wire conveyor spindle 7 proceeds in the present two exemplified embodiments in FIGS. 1 and 4 and 5 of the drawing from right to left to the outflow opening 4, as indicated in FIG. 1 by arrow 7'.

In the instant powder container 2, moreover, above the wire conveyor spindle 7, a back feed conveyor screw 16 is horizontally arranged, vertically spaced in parallel to the wire conveyor spindle 7. A back feed conveyor screw shaft 15 on which the back feed conveyor screw 16 is pushed-on, is pivoted on a front-side back feed conveyor screw shaft bearing 17. At the end of the back feed conveyor screw shaft 15 facing the back feed conveyor screw bearing 17, the latter is supported in a rear wall 6' of the housing 2 and/or in the gear unit 14 disposed on the rear wall at the outside and, via it, is transmission-wise connected with the motor 13 designed as an electro motor.

The gear unit 14 is so designed that the wire conveyor spindle 7 and the back feed conveyor screw shaft 15 together with the back feed conveyor screw 16 are rotated in opposed direction of rotation relative to each other when the motor is switched on. The directions of rotation opposing each other of the wire conveyor spindle 7 and of the back feed conveyor screw 16 should be provided in case of even directions of the threads of the conveyor spindle 7 and of the back feed conveyor screw 16.

As can particularly be taken from FIG. 1, a back feed track 16' over which the back feed conveyor screw 16 extends, is shorter than the, non-designated, conveyor track of the wire conveyor spindle 7 which extends from the conveyor spindle drive journal 8 until the outflow opening 4.

Since the back feed conveyor screw need to return only part of the instant powder conveyed by the wire conveyor spindle 7 to the outflow opening 4 to a central area of the instant powder container 2, the conveying capacity of the back feed conveyor screw 16 smaller than that of the wire conveyor spindle 7. With a view thereto, the motor 13 is additionally loaded by the back feed conveyor screw 16 to a small extent only.

Nevertheless, the back feed conveyor screw 16 safeguards that instant powder perhaps conveyed in excess in conveying direction 7' will not heap up at the outflow opening side end of the wire conveyor spindle 7' or the front wall 6 inside the housing 2.

The wire conveyor spindle, the back feed conveyor screw and the back feed conveyor screw shaft preferably consist of metal and are electro-conductively supported in order to avoid electrostatic charging of the instant powder and an instant powder behavior thereby caused.

In the second embodiment of the instant powder conveying device 1', as can be taken from FIGS. 4 to 7, two striking elements 18 and 19 are engaging into the wire conveyor spindle 7, staggered in axial direction of the wire conveyor spindle 7, or in conveying direction 7', respectively, substantially disposed above it, namely successively to the back feed conveying track 16'. The axial direction of the wire conveyor spindle 7 constitutes the direction of its virtual center axis or rotational axis. The striking elements 18 and 19 each, as can be taken from FIG. 4 for the striking element 18, are adapted to the bottom area of the instant powder container 2 and movable while not impeded by the bottom area.

The two striking elements 18 and 19 each are connected via a plate spring 20, or 21, respectively, as return spring, by means of a return spring connection 23, or 24, with a cartridge shaped striking element carrier 22 as a suspension above the wire conveyor spindle 7. The striking element carrier 22 is fastened to the rear wall 6', but might also be provided, in a different embodiment, on the non-designated lid above the striking element carrier 22.

Figure 4:
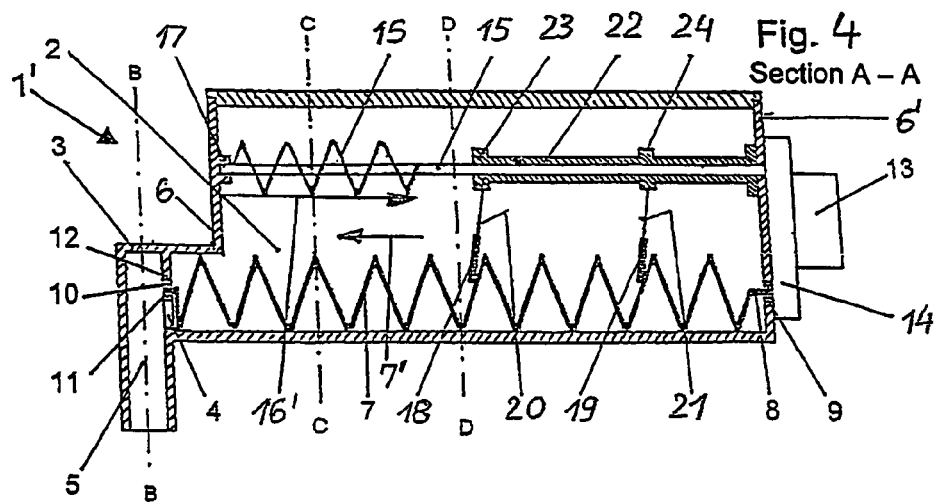
Figure 5:
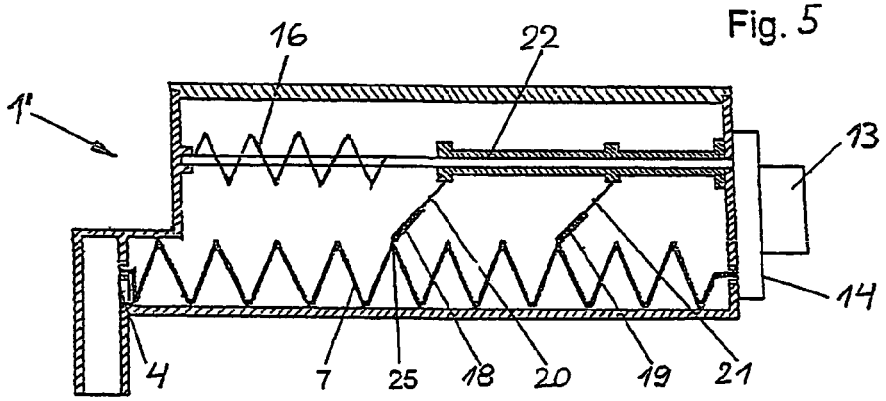
Figure 6:
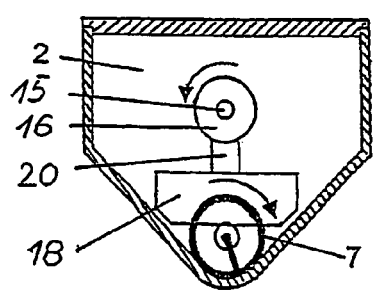
Figure 7:
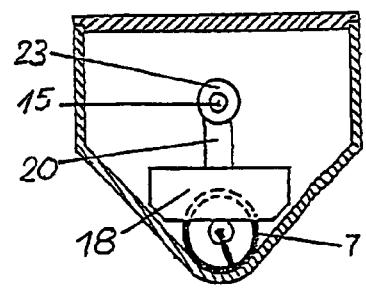

In the situation as shown in FIG. 4, the two striking elements 18 and 19 are in a starting position, in which they rest on one flank each of the wire conveyor spindle 7. When rotating the wire conveyor spindle 7 by means of the electro motor 13, they glide along the coil of the wire conveyor spindle 7 until they arrive at the reset position shown in FIG. 5 referred to, for striking element 18, by 25. In the reset position, when continuing to rotate the wire conveyor spindle 7, they glide under the effect of the return springs 20, 21, beyond the adjacent flank of the wire conveyor spindle 6 and, while loosening the instant powder, bounce back into the starting position shown in FIG. 4 where each of them rest again at one flank of the wire conveyor spindle 7 to be drawn again in the conveying direction. If the striking elements 19, 20 meet resistance when bouncing back, be it clotted instant powder or the following flank of the wire conveyor spindle, they act effectively, by their impact, onto the resistance. In this way, the instant powder is effectively loosened up either directly or indirectly via the wire conveyor spindle 7 before the return conveyor track, and is conveyed without any trouble by means of the wire conveyor spindle 7 to the outflow opening 4, while the instant powder will not excessively heap up at the front wall 6 within the instant powder container 2.

The invention claimed:

1. An instant powder conveyor device (1, 1') of a drinks preparing machine comprising a rotatable wire conveyor spindle (7) or conveyor screw substantially horizontally disposed in a bottom area of an instant powder container (2), at the end of which an outflow opening (4) is provided, wherein
   in said instant powder container (2) above said wire conveyor spindle (7) or said conveyor screw, at least one back feed conveyor screw (16) contra-rotating thereto is disposed, and the back feed conveyor track (16') of which starts near the end of said wire conveyor spindle (7), or conveyor screw, and is shorter than the conveyor track of said wire conveyor spindle (7), or conveyor screw, and
   in said instant powder container (2) at least one striking element (18, 19) which is elastically adjustable in an axial direction of said wire conveyor spindle (7), or conveyor screw, and is arranged into the wire conveyor spindle (7), or conveyor screw, substantially transverse relative thereto, is arranged axially staggered relative to said back feed conveyor track (16') of said at least one back feed conveyor screw (16).

2. The instant powder conveyor device according to claim 1, wherein at least two back feed conveyor screws are pushed, exchangeable and axially spaced relative to each other on a back feed conveyor screw shaft.

3. The instant powder conveyor device according to claim 1 or 2, wherein the at least one back feed conveyor screw (16) is designed to have a smaller conveying capacity than the conveying capacity of the wire conveyor spindle (7), or conveyor screw.

4. The instant powder conveyor device according to claim 1, wherein the at least one back feed conveyor screw (16) and the wire conveyor spindle (7), or conveyor screw, are, gear-wise, connected with a common motor.

5. The instant powder conveyor device according to claim 1, wherein said striking element (18, 19) is disposed outside of said wire conveyor spindle (7), or conveyor screw, preferably above on a stationary striking element carrier (22), and a return spring (20, 21) is connected with said striking element carrier (22) on one side and with said striking element (18, 19) on the other.

6. The instant powder conveyor device according to claim 5, wherein said striking element carrier (22) is cartridge shaped and lodges one section of the back feed conveyor screw shaft (15).

7. The instant powder conveyor device according to claim 5 or 6, wherein said striking element (18, 19) is connected via a plate spring (20, 21) as return spring with said striking element carrier (22).

8. The instant powder conveyor device according to claim 5 or 6, wherein said striking element (18, 19) has an impacting face disposed substantially transverse relative to the axial direction of said wire conveyor spindle (7), or conveyor screw.

9. The instant powder conveyor device according to claim 5 or 6, wherein said impacting face is disposed inclined about the pitch angle of said wire conveyor spindle (7), or conveyor screw, against its normal cross sectional area.

10. The instant powder conveyor device according to claim 5 or 6, wherein said impacting face is adapted to the cross section of the bottom area of said instant powder container (2).

11. The instant powder conveyor device according to claim 5 or 6, wherein a plurality of striking elements (18, 19) is arranged in a staggered way in axial direction of said wire conveyor spindle (7), or conveyor screw.

* * * * *